H. O. SMITH.
GREASE CUP.
APPLICATION FILED JULY 23, 1910.
993,896.
Patented May 30, 1911.
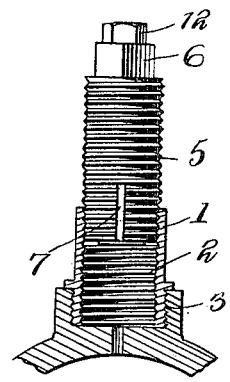
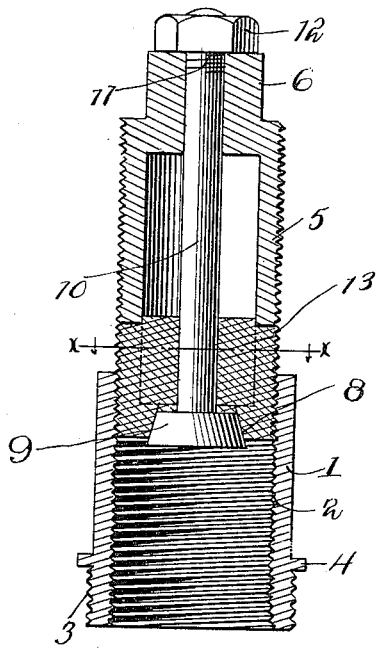
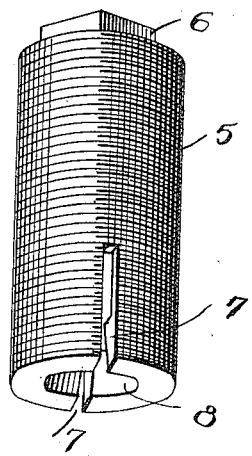
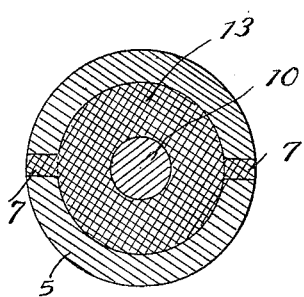
Witnesses
William Smith
V. B. Hillyard.
Inventor
Holland O. Smith.
By Victor J. Evans
Attorney

UNITED STATES PATENT OFFICE.

HOLLAND O. SMITH, OF BELLEFONTAINE, OHIO.

GREASE-CUP.

993,896.　　　　　Specification of Letters Patent.　　Patented May 30, 1911.

Application filed July 23, 1910.　Serial No. 573,534.

*To all whom it may concern:*

Be it known that I, HOLLAND O. SMITH, a citizen of the United States, residing at Bellefontaine, in the county of Logan and State of Ohio, have invented new and useful Improvements in Grease-Cups, of which the following is a specification.

The present invention appertains to the type of lubricators in which the lubricant is forced from the cup or receptacle by means of a screw plug, said lubricant being of the non-fluid type.

The purpose of the invention is the provision of novel means for securing the screw plug against accidental displacement, particularly when the lubricator is applied to moving parts, such as connecting rods or parts subjected to vibration, which tends to loosen the plug and result in loss thereof.

The invention consists of the novel features, details of construction and combination of parts, which hereinafter will be more particularly set forth, illustrated in the accompanying drawing, and pointed out in the appended claim.

Referring to the drawing, forming a part of the application, Figure 1 is a detail view, showing the application of the invention, the grease cup being in section. Fig. 2 is a view of the lubricator in section. Fig. 3 is a horizontal section on the line $x$—$x$ of Fig. 2. Fig. 4 is a detail view of the plug.

Corresponding and like parts are referred to in the following description, and indicated in all the views of the drawing, by the same reference characters.

The device comprises a cup or receptacle 1 which is adapted to be fitted to the part to be lubricated, said cup being internally threaded, as indicated at 2, and having a portion externally threaded, as at 3, to make connection with the part to which the lubricator is to be fitted. The cup has an outer flange 4, which constitutes a stop to limit the inward movement of the cup when screwing it home in the opening of the part provided for its reception. The lubricant, which may be hard oil of any kind, is supplied to the cup or receptacle 1 and is forced therefrom by means of a plug 5, which is externally threaded to match the inner screwthreads 2 of the cup 1, the plug 5 being provided with an angular portion 6 to receive a wrench or other tool to facilitate turning of the same.

The plug 5 is preferably hollow or chambered and has slots 7 extending inwardly from its lower end, whereby provision is had for spreading or expanding the lower portion of the plug. A tapered opening 8 is formed in the lower end of the plug and is adapted to receive a conical head 9 at the lower end of a stem 10, said parts forming the spreader or expander by means of which the parts of the plug bordering upon the slots 7 are separated to cause the lower portion of the plug to firmly grip the inner walls of the cup or receptacle 1 and thereby prevent possible loosening or displacement of the plug when the device is in service. The plug 5 is of uniform diameter throughout its length and corresponds to the internal diameter of the cup so as to fit the latter snugly.

The spreader or expander consists of the stem 10 and head 9, the two being of integral formation and the upper portion of the stem 10 being threaded at 11 to receive a set nut 12, which is adapted to engage the upper end of the plug and move the stem lengthwise thereof to force the conical head 9 into the tapered opening 8, thereby expanding the lower end of the plug and securing the same within the cup.

To prevent the grease passing into the chamber or space of the plug and through the slots 7 thereof and out through the joint formed between the plug and cup a filling 13 is utilized, the same occupying the slots 7 and the lower portion of the space or chamber of the plug. The filling 13 consists of a metal which is easily fusible, the same being poured into the lower portion of the plug in a molten condition and filling the slots 7, the outer edges of the filling occupying the slots 7 conforming to the threaded walls 2 of the cup 1, thereby preventing the lubricant passing thereby when subjected to pressure upon turning the plug 5 to cause the same to enter the cup 1 and displace the oil therefrom. The filling may consist of Babbitt metal or other composition of lead, tin and the like.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

A lubricator comprising a grease cup internally threaded, a hollow plug externally threaded to match the inner threads of the grease cup and having longitudinal slots in its lower portion and formed with a centrally disposed tapered opening in its lower end in communication with said slots, a stem passing loosely through the plug and having a conical head at its lower end to fit the tapered opening of the plug, means for moving the stem to force the conical head thereof into the tapered opening of the plug for expanding the lower end of the latter, and a filling occupying the lower portion of the space and the slots of the plug to prevent escape of the lubricant.

In testimony whereof I affix my signature in presence of two witnesses.

HOLLAND O. SMITH.

Witnesses:
JOHN R. CASSIDY,
ANNA PORTER.

Copies of this patent may be obtained for five cents each, by addressing the "Commissioner of Patents, Washington, D. C."